(12) United States Patent
Chang et al.

(10) Patent No.: US 7,604,469 B2
(45) Date of Patent: Oct. 20, 2009

(54) DEGATING DEVICE

(75) Inventors: Yun-Lung Chang, Kaohsiung (TW);
Chin-Sung Lee, Kaohsiung (TW);
Chia-Ming Chang, Kaohsiung (TW);
Yu-Chang Tsai, Kaohsiung (TW)

(73) Assignee: Advanced Semiconductor Engineering, Inc., Kaohsiung (TW)

( * ) Notice: Subject to any disclaimer, the term of this patent is extended or adjusted under 35 U.S.C. 154(b) by 478 days.

(21) Appl. No.: 11/651,004

(22) Filed: Jan. 9, 2007

(65) Prior Publication Data

US 2008/0044511 A1 Feb. 21, 2008

(30) Foreign Application Priority Data

Aug. 18, 2006 (TW) ............... 95130555 A

(51) Int. Cl.
*H01L 21/56* (2006.01)
*B29C 45/14* (2006.01)

(52) U.S. Cl. ............. 425/127; 425/544; 425/547; 425/552; 425/556

(58) Field of Classification Search ............ 425/127, 425/129.1, 544, 547, 552, 556, 806
See application file for complete search history.

(56) References Cited

U.S. PATENT DOCUMENTS 2,923,976 A * 2/1960 Strauss ............... 425/547
4,976,900 A * 12/1990 Tsutsumi ............... 425/547

FOREIGN PATENT DOCUMENTS

| JP | 62149141 A | * | 7/1987 |
| JP | 02050442 A | * | 2/1990 |
| JP | 07058137 A | * | 3/1995 |

OTHER PUBLICATIONS

Partial machine translation of JP 07-058137 A dated Mar. 1995 obtained from the JPO website.*

* cited by examiner

*Primary Examiner*—Robert B Davis
(74) *Attorney, Agent, or Firm*—Jianq Chyun IP Office

(57) ABSTRACT

A degating device applied to remove a cull between two chip carriers comprises a lower mold, an upper mold, a blowing-opening, and a cooling pipe. The lower mold is used to load chip carriers and has a plunger set for propping and degating the cull. The upper mold is fit in with the lower mold tightly. The airflow blown out from the blowing-opening blows to lower the temperature around the chip carriers. The cooling pipe is disposed according to the position of the blowing-opening to cool down the temperature around the blowing-opening. The two chip carriers are disposed on the lower mold and fixed between the upper mold and the lower mold while the upper mold combines with the lower mold. By changing the position of the plunger set relative to the upper mold and the lower mold, the cull can be stripped from the chip carriers.

20 Claims, 3 Drawing Sheets

DEGATING DEVICE

BACKGROUND OF THE INVENTION (1) Field of the Invention

The present invention relates to a degating device, more particularly to a degating device for cooling down the temperature of the compound of a cull quickly and uniformly.

(2) Description of the Prior Art

In the process of manufacturing an integrated circuit chip (IC chip), after a die carrying out a signal operation is fixed and electrically connected to a die substrate or a lead frame, a molding process is required to encapsulate the die by a packaging compound and protect the die not damaged from external forces.

A ball grid array package (BGA Package) is taken as an example, a plurality of dies are disposed on a die substrate in the arrangement of matrix array, and the dies are connected to signal terminals of the die substrate respectively by metal lines, and then the molding process is proceeded.

In the molding process, a plurality of die substrates with the dies (in general, two die substrates is required) are symmetrically disposed in mold cavities of molds for sealing compound. When the molds are combined, gaps between the molds and the die substrates are reserved as runners and gates. Colloidal particles are placed at the center of the mold. When the colloidal particles are melted and pressed, the colloidal particles become compound flow, and then the compound flow injects into the mold cavities through the runner and gate so as to cover the dies and the die substrates. The compound flow is cured after cooling down.

Please refer to FIG. 1, which is a schematic diagram of a die substrate after proceeding the molding process. The colloidal particles between the two die substrates 10 become the compound flow after being melted and pressed. The compound flow injects into the die substrates 10 through the runner and the gate. A plurality of sealing compound regions 11, a plurality of runner regions 12, a plurality of gate regions 13, and a plurality of residues 14 are formed after the compound flow is cured.

After completing the molding process, the runner regions 12, the gate regions 13, and the residues 14 are totally as a cull, which needs to be stripped by a degating process.

The main principle of the degating process is to fix the die substrate or the cull and make them move relatively, thereby the cull is stripped from the die substrates.

For example, please refer to FIG. 2, after fixing the two die substrates, a plunger set 15 pushes the residues 14 between the two die substrates in order to let the residues 14, the runner regions 12, and the gate regions 13 be stripped from the die substrate 10.

Moreover, after completing the molding process, the temperature of the compound are still very high even though the compound flow is cured, thereby the gate regions 13 are easily remained on the die substrates 10 when proceeding the degating process. Therefore, before stripping the cull, it is necessary to cool down the temperature of the cull.

Therefore, how to quickly and effectively lower the temperature of the cull and accomplish the degating process successfully are objects for people whom are familiar with this art to dedicate.

SUMMARY OF THE INVENTION

Therefore, an objective of the present invention is to provide a degating device, which is used to cool down the temperature of the compound of a cull quickly and uniformly while removing the cull so as to improve the above shortcomings.

The degating device of the present invention is to remove a cull between two chip carriers. The chip carrier may be a die substrate, a lead frame, a flexible substrate, and other carriers packaged for dies.

The degating device applied to remove a cull between two chip carriers comprises an upper mold, a lower mold, a blowing-opening, and a cooling pipe.

The lower mold is used to load the chip carriers and has a plunger set for propping the cull.

The upper mold is fit in with the lower mold tightly. After placing the chip carriers on the lower mold, the chip carriers are fixed between the upper mold and the lower mold by way of the combination of the upper mold and the lower mold. The cull can be stripped from the chip carriers by changing a position of the plunger set relative to the upper mold and the lower mold.

The blowing-opening is disposed in the upper mold or the lower mold. The airflow is blown out from the blowing-opening to lower the temperature around the chip carriers.

The cooling pipe is disposed according to the position of the blowing-opening, and can be disposed inside the upper mold or the lower mold for cooling down the temperature of the blowing-opening.

As a result, the present invention can not only lower the compound temperature by the airflow blown by the blowing-opening, but also maintain the blowing-opening temperature by the cooling pipe, thereby to avoid the high temperature problem after the degating device is operated for a long period of time.

These and other objectives of the invention will no doubt become obvious to those of ordinary skill in the art after reading the following detailed description of the preferred embodiment, which is illustrated in the various figures and drawings.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
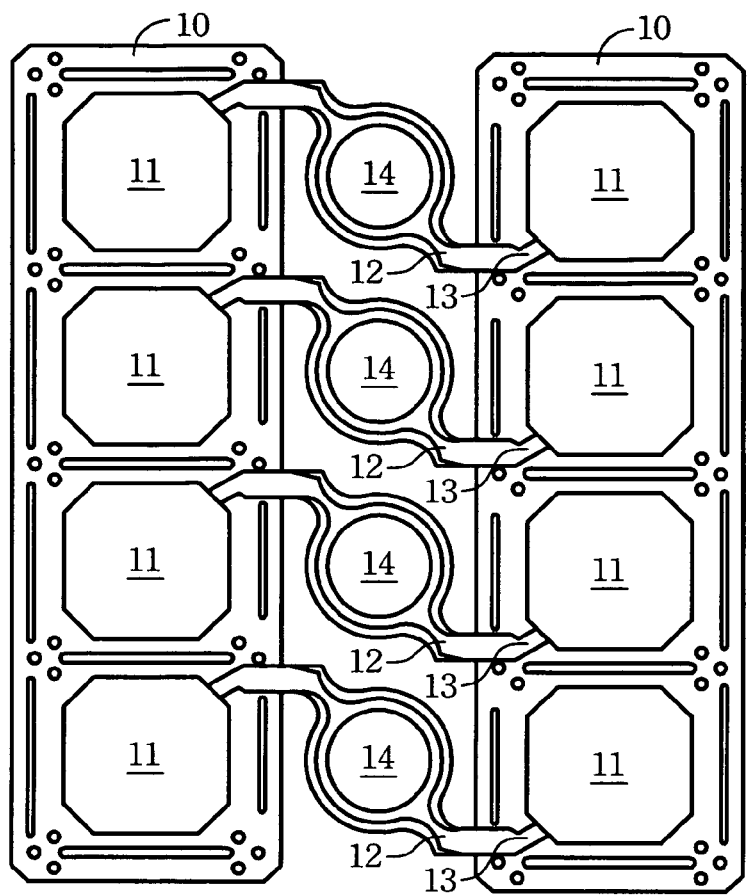
FIG. 1 illustrating a schematic diagram of a die substrate after proceeding the molding process.
Figure 2:
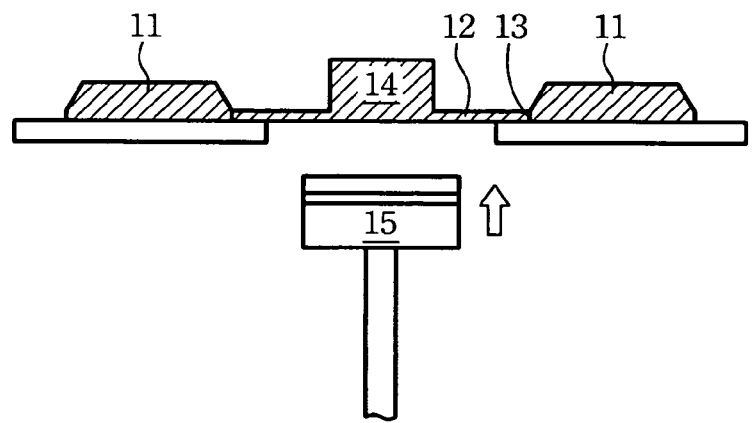
FIG. 2 illustrating a schematic diagram of removing a compound process.
Figure 3:
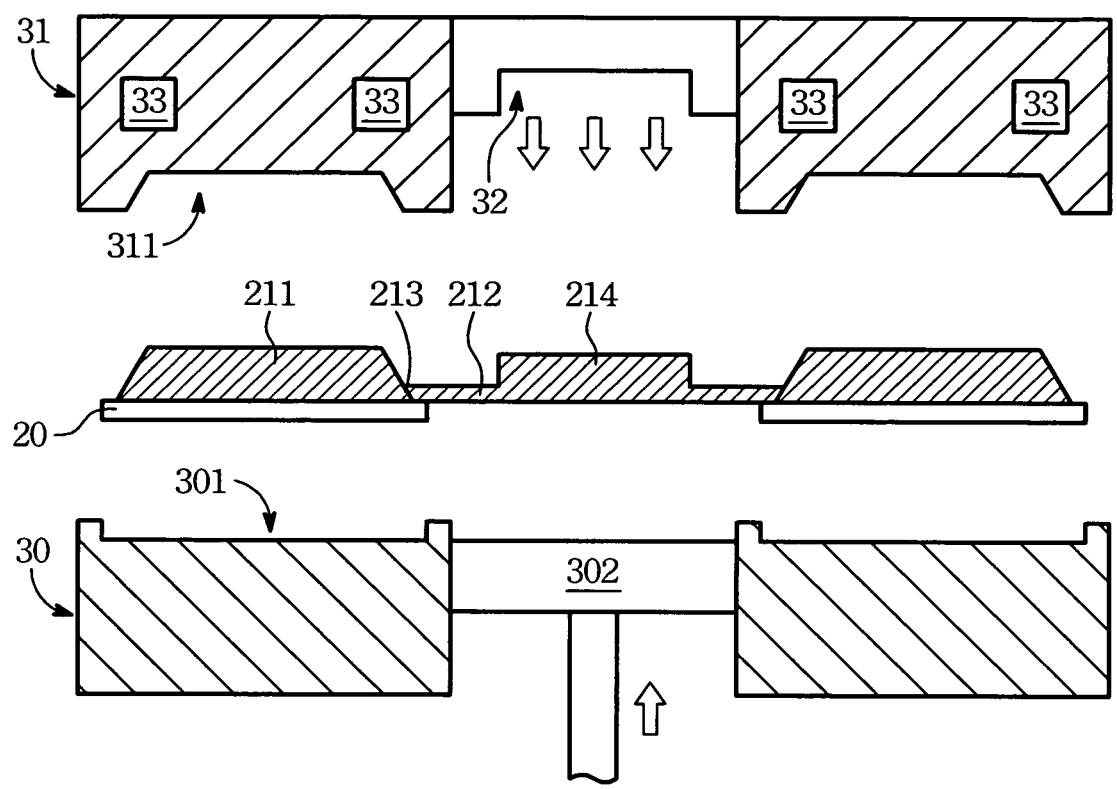
FIG. 3 illustrating a schematic diagram of a degating device according to a first embodiment of the present invention.

Please refer to FIG. 3, which is a schematic diagram of a degating device according to a first embodiment of the present invention. The embodiment of the present invention takes the degating process of a ball grid array package as an example to illustrate, but not be limited, the present invention still can be applied to the degating process in many kinds of packaging.

A die substrate is a chip carrier in the ball grid array package. As shown in FIG. 3, when the two die substrates 20 are finished with the molding process, a cured compound flow covers on the two die substrates 20 and the periphery of dies to form a sealing compound region 211, a plurality of runner regions 212, a plurality of gate regions 213, and a plurality of residues 214. Wherein the runner regions 212, the gate regions 213, and the residues 214 are totally as a cull, which needs to be stripped.

The degating device can be disposed in a sealing compound table. After finishing the molding process, the die substrate 20 can be moved to the degating device by a robot manipulator. The degating device includes a lower mold 30, a upper mold 30, a blowing-opening 32, and a cooling pipe 33.

The lower mold 30 has two lower mold cavities 301, the shape of the lower mold cavity 301 is designed according to the type of the die substrate 20 and the shape of the lower part of the die substrate 20.

Continuously, the lower mold 30 has a plunger set 302 for propping the cull. The plunger set 302 includes a plurality of plungers which is disposed at the center of the lower mold 30.

The upper mold 31 can fit in with the lower mold 30 tightly. The upper mold 31 has two upper mold cavities 311, and the shape of the upper mold cavity 311 is designed according to the type of the package after encapsulating and the shape of the upper part of the sealing compound region 211. So, in the preferred embodiment of the present invention, the upper mold 31 and the lower mold fit in with the package.

The two lower mold cavities 301 of the lower mold 30 can receive the lower part of the two die substrates 20 while the two die substrates 20 are disposed on the lower mold 30, and residues between the two die substrates 20 are located on the top of the plungers.

The upper mold cavities 311 of the upper mold 31 can receive the upper part of the two packages while the lower mold 30 combines with the upper mold 31. The two packages are fixed between the upper mold 31 and the lower mold 30 by way of the combination of the upper mold 31 and the lower mold 30. The plungers are elevated to pull out the residues 214 and let the runner region 212 and the gate region 213 peel away from the packages simultaneously in order to strip the cull.

Figure 4:
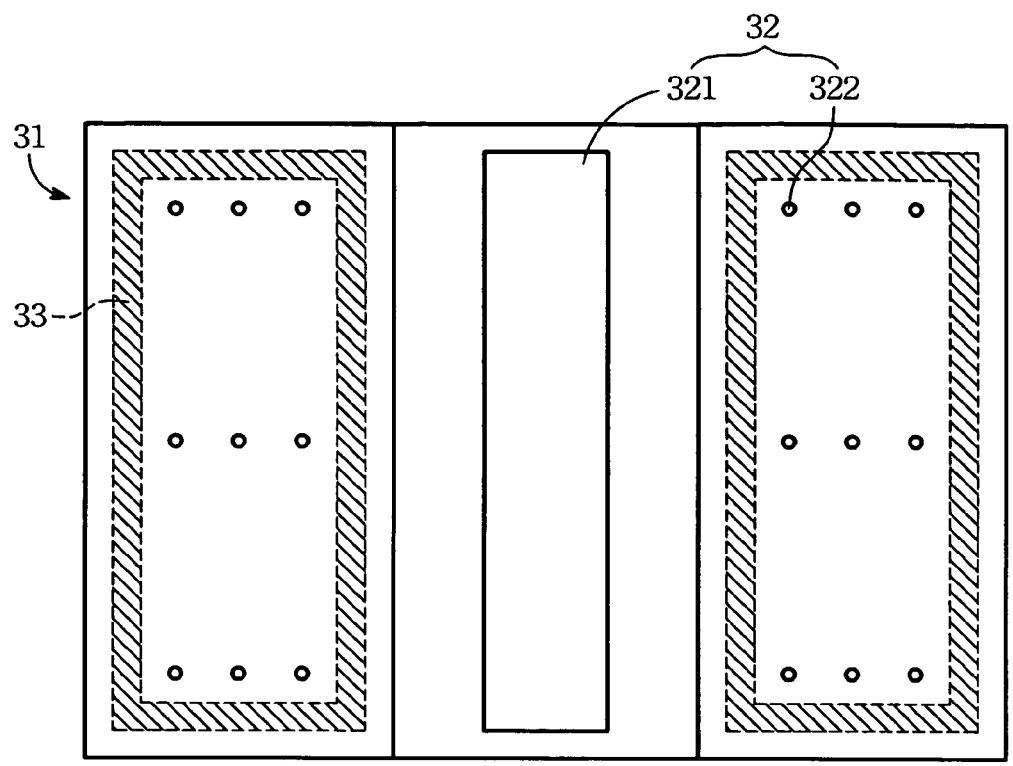
FIG. 4 illustrating a bottom view of an upper mold of the degating device according to the first embodiment of the present invention.

Please refer to FIG. 4, which is a bottom view of the upper mold 31 of the degating device according to the first embodiment of the present invention. The blowing-opening 32 disposed in the upper mold 31 includes a long blowing-opening 321, which is disposed at the center of the upper mold 31. The blowing-opening 32 can blow the airflow toward the residues 214 to lower the temperature around the residues 214 and the two die substrates 20 so as to cool down the compound.

In a preferred embodiment, the blowing-opening 32 includes a plurality of openings 322. The openings 322 are uniformly distributed on the upper mold 31. Therefore, the temperature around the two die substrate 20 is cooled down quickly and uniformly while the airflow is blown out.

Moreover, after the degating device has been operated for a long period of time, the temperatures of the upper mold 30 and the lower mold 31 are increased constantly because of the high temperature of the compound; and further, it also affects the temperature of the blowing-opening 32 so as to increase the temperature of the airflow blown from the blowing-opening 32 and reduce the cooling effect.

The degating device of the present invention also has a cooling pipe 33. The cooling pipe 33 is disposed inside the upper mold 31 for cooling down the temperatures of the upper mold 31 and the blowing-opening 32.

As shown in FIG. 4, the cooling pipe 33 can surround the periphery of the openings 322. One of the other disposed manners of the cooling pipe 33 as that the cooling pipe is an S-shape disposed in the body of the upper mold 31 is practicable.

The cooling pipe 33 is filled with a cooling material, which can be clean dry air, liquid water, and so on. In a preferred embodiment, the cooling pipe 33 connects to an external cooling system to proceed circulation, and then remove the heat from the upper mold 31.

Besides, the cooling pipe 33 of the present invention can change its disposed position according to demands. For example, when the blowing-opening 32 is disposed in the lower mold 30, the cooling pipe 33 can be disposed in the lower mold 30 as well.

Figure 5:
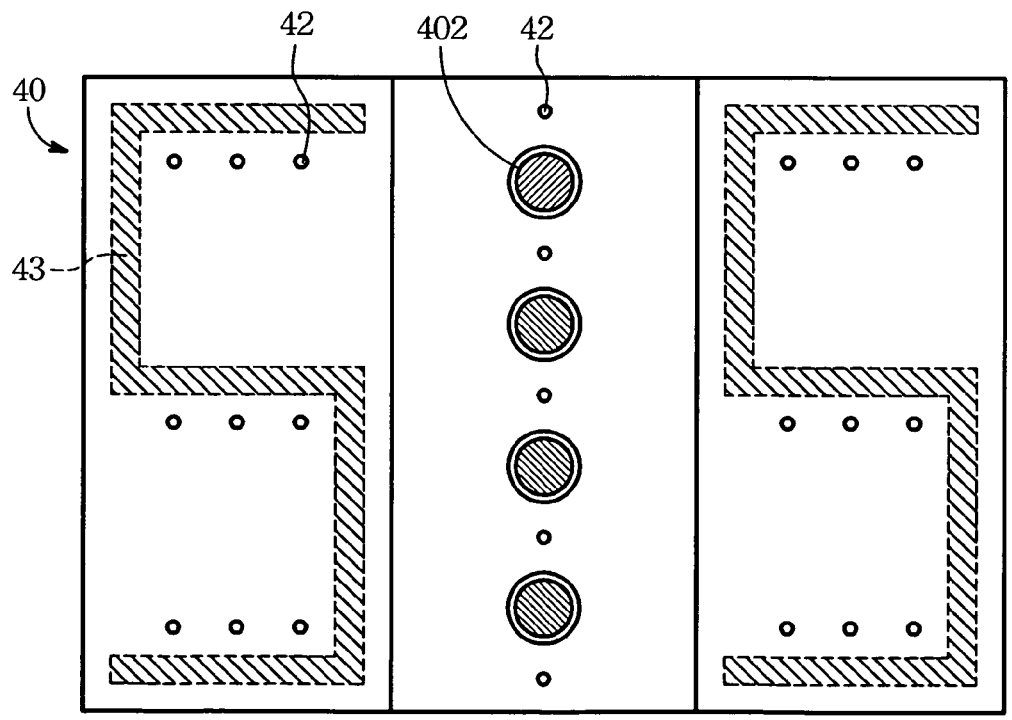
FIG. 5 illustrating a top view of a lower mold of the degating device according to a second embodiment of the present invention.

Please refer to FIG. 5, which is a top view of the lower mold of the degating device according to the second embodiment of the present invention. The difference between the second embodiment and the first embodiment is described as the following paragraphs.

The blowing-opening 42 disposed in the lower mold 40 includes a plurality of openings. The openings are uniformly distributed on the lower mold 40 and among the plunger sets 402. The airflow is blown out from the openings to lower the temperature around the die substrates.

The cooling pipe 43 is also disposed inside the lower mold 40 for cooling down the temperature of the lower mold 40 and the blowing-opening 42. The cooling pipe 43 is an S-shape for this embodiment.

With above description, the present invention can not only lower the compound temperature by the airflow blown out from the blowing-opening but also maintain blowing-opening temperature by the cooling pipe, so as to avoid the high temperature problem after the degating device has been operated for a long time.

In a preferred embodiment, the blowing-opening comprises a plurality of openings uniformly distributed over the body the mold in order to cool down the temperature around the die substrate quickly and uniformly. Therefore, it is beneficial not only to proceed degating process, but also to improve the substrate warping problem while the die substrate proceeds molding process.

With the example and explanations above, the features and spirits of the invention are hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A degating device applied to remove a cull between two chip carriers, comprising:
    a lower mold used to load said two chip carriers and having a plunger set for propping said cull up;
    an upper mold fit in with said lower mold;
    a blowing-opening and a cooling pipe disposed in one of said upper mold and said lower mold, wherein the airflow is blown out from said blowing-opening to lower the temperature around said two chip carriers, and said cooling pipe is for cooling down the temperature of said blowing-opening.

2. The degating device of claim 1, wherein said cull comprises a plurality of runner regions, a plurality of gate regions, and a plurality of residues.

3. The degating device of claim 1, wherein said plunger set comprises a plurality of plungers, and said plungers is elevated to let said cull peel away from said two chip carriers while said upper mold combines with said lower mold.

4. The degating device of claim 1, wherein said upper mold has two mold cavities for receiving a part up said two chip carriers while said upper mold combines with said lower mold.

5. The degating device of claim 1, wherein said lower mold has two mold cavities for receiving the lower part of said two chip carriers while said two chip carriers are disposed in said lower mold.

6. The degating device of claim 1, wherein said blowing-opening is a long blowing-opening and is disposed at the center of said upper mold.

7. The degating device of claim 1, wherein said blowing-opening comprises a plurality of openings, said openings are uniformly distributed on said upper mold.

8. The degating device of claim 7, wherein said cooling pipe surrounds the periphery of said openings.

9. The degating device of claim 1, wherein said cooling pipe is an S-shape.

10. The degating device of claim 1, wherein said cooling pipe is filled with a cooling material.

11. The degating device of claim 10, wherein said cooling material is selected from one of clean dry air and liquid water.

12. The degating device of claim 10, wherein said cooling pipe further connects to an external cooling system to proceed circulation.

13. The degating device of claim 1, wherein said degating device is disposed in a sealing compound table.

14. A degating device applied to remove a cull between two chip carriers comprising:
 a lower mold being used to load said two chip carriers and having a plunger set for propping said cull up;
 an upper mold being fit in with said lower mold, wherein when said upper mold combines with said lower mold and said two chip carriers are fixed between said upper mold and said lower mold, said cull can be stripped from said two chip carriers by changing a position of said plunger set relative to said upper mold and said lower mold;
 a blowing-opening and a cooling pipe disposed in one of said upper mold and said lower mold, wherein the airflow is blown out from said blowing-opening to lower the temperature around said two chip carriers, and said cooling pipe is for cooling down the temperature of said mold and said blowing-opening.

15. The degating device of claim 14, wherein said cull comprises a plurality of runner regions, a plurality of gate regions, and a plurality of residues.

16. The degating device of claim 14, wherein said plunger set comprises a plurality of plungers, said plungers are disposed at the center of said lower mold, said plungers is elevated to let said cull peel away from said chip carriers while said upper mold combines with said lower mold.

17. The degating device of claim 14, wherein said upper mold has two mold cavities for receiving a part up said two chip carriers while said upper mold combines with said lower mold.

18. The degating device of claim 14, wherein said lower mold has two mold cavities for receiving the lower part of said two chip carriers while said two chip carriers are disposed in said lower mold.

19. The degating device of claim 14, wherein said blowing-opening comprises at least one opening uniformly distributed on said lower mold.

20. The degating device of claim 14, wherein said cooling pipe is filled with a cooling material and an external cooling system connects to said cooling pipe for circulation, and cooling material is selected from one of clean dry air and liquid water.

* * * * *